STEREOSCOPIC DESIGN FOR LEFT INDICATOR

Aug. 2, 1949.　　　　R. H. RANGER　　　　2,477,651
STEREOSCOPIC POSITION INDICATING MEANS
Filed June 27, 1944　　　　　　　　　　4 Sheets-Sheet 3

STEREOSCOPIC DESIGN FOR RIGHT INDICATOR

Inventor
RICHARD H. RANGER
By Lawrence Glassman
ATTORNEY

Aug. 2, 1949.  R. H. RANGER  2,477,651
STEREOSCOPIC POSITION INDICATING MEANS
Filed June 27, 1944  4 Sheets-Sheet 4

INVENTOR
RICHARD H. RANGER
BY William D. Hall
ATTORNEY

Patented Aug. 2, 1949

2,477,651

UNITED STATES PATENT OFFICE 2,477,651

STEREOSCOPIC POSITION INDICATING MEANS

Richard H. Ranger, Newark, N. J.

Application June 27, 1944, Serial No. 542,423

2 Claims. (Cl. 88—29)

(Granted under the act of March 3, 1883, as amended April 30, 1928; 370 O. G. 757)

The invention described herein may be manufactured and used by or for the Government for governmental purposes, without the payment of any royalty thereon.

This invention relates to radio-object-locating systems; and more particularly to improvements in radio locators utilizing plan position indicators for furnishing the desired information concerning the location of targets.

A plan position indicator presents a polar coordinate map in terms of range and bearing of all objects "visible" to a radar system. This type of indication may be produced by means of a narrow beam transmitting-receiving antenna array rotated around its vertical axis; and a receiver connected to a cathode ray oscilloscope with a radial sweep synchronously following the rotating antenna. The rotating radial sweep makes an electron-beam sweep from the center of a long-persistence fluorescent screen of the cathode ray tube to its outer edge. By starting the radial sweep at the instant of transmitting a radio frequency pulse, the radial distance on the screen of the cathode ray tube is made to represent the range of an object. An angle formed between a reference-line and a radial trace through the center of an echo image is made to represent the bearing of an object, or its azimuth; by rotating the radial sweep about the longitudinal axis of the tube in synchronism and in phase with the rotation of the antenna so that the radial sweep and the axis of the antenna lobe always point in exactly the same direction. When a radio frequency pulse from the transmitter strikes an object, some small portion of energy will be reradiated back in the direction of the radio locator receiver, and if the reflected pulse is sufficiently strong, a distinguishable signal or echo is registered by the receiver. These signals are applied to an intensity grid of the cathode ray tube to produce brightening of the cathode ray trace for each echo received. This so-called intensity modulation results in the echoes appearing as bright circular arcs on the fluorescent screen of the oscilloscope. A target appears as a small arc due to the width of the antenna beam as the antenna is rotated in azimuth. The radial distance and the angular position of the center of such an arc give respectively the range and the azimuth of the target producing this arc. For obtaining bearing readings, a scale in degrees is usually provided around the periphery of the cathode ray tube screen with a 0° line pointing to the north. Some form of range scale is also provided for determining the range of a target; this scale consisting in some instances of concentric circles engraved on a transparent grating superimposed over the screen of the tube, and in other instances it consists of "marker" signals which intensity modulate the cathode ray beam so that they appear as bright circles on the oscilloscope screen.

The plan position indicator has the inherent advantage of presenting on the screen of a cathode ray tube the true bearing and range of all targets in the plane in which the antenna is rotating. When the exploratory pulse leaves the antenna, the beam of the cathode ray tube leaves the geometric center of the screen traveling in the same indicated direction as the radiated pulse. A brief time later the echo reaches the receiver and at this instant the output of the receiver intensifies the cathode ray beam which in turn produces a luminous spot on the screen of the tube. Thus, the distance of the spot from the center is proportional to the range. To obtain azimuth scanning, the antenna is rotated at a uniform angular velocity, and the sweep is made to follow the antenna so that the radial path of the cathode ray beam and the axis of the antenna lobe continuously point in the same direction. Thus, the angular position of the spot on the oscilloscope screen represents the true bearing of the object. After completion of the sweep, the cathode ray beam returns to the center of the tube and waits for the next exploratory pulse to leave the antenna.

Frequently, there is superimposed over the screen of the oscilloscope a grid or grating of polar coordinates together with a transparent map of the locality that is being scanned. The map and the grating are ordinarily so oriented that the north-south line coincides with the 0-180° azimuth line of the superimposed grating.

While the usual plan position indicator will indicate the range and azimuth of an object, it gives no indication of the altitude, and it has heretofore been necessary to calculate the altitude.

It is therefore an object of this invention to provide means for determining simultaneously the range, azimuth and altitude of an object.

A further object is the provision of means used in combination with plan position indicators to produce a stereoscopic effect on images of maps to indicate simultaneously the altitude, range and azimuth of an object.

These and other objects are attained by the novel arrangement and construction hereinafter described and illustrated in the accompanying drawings, forming a part hereof and in which.

Figure 1:
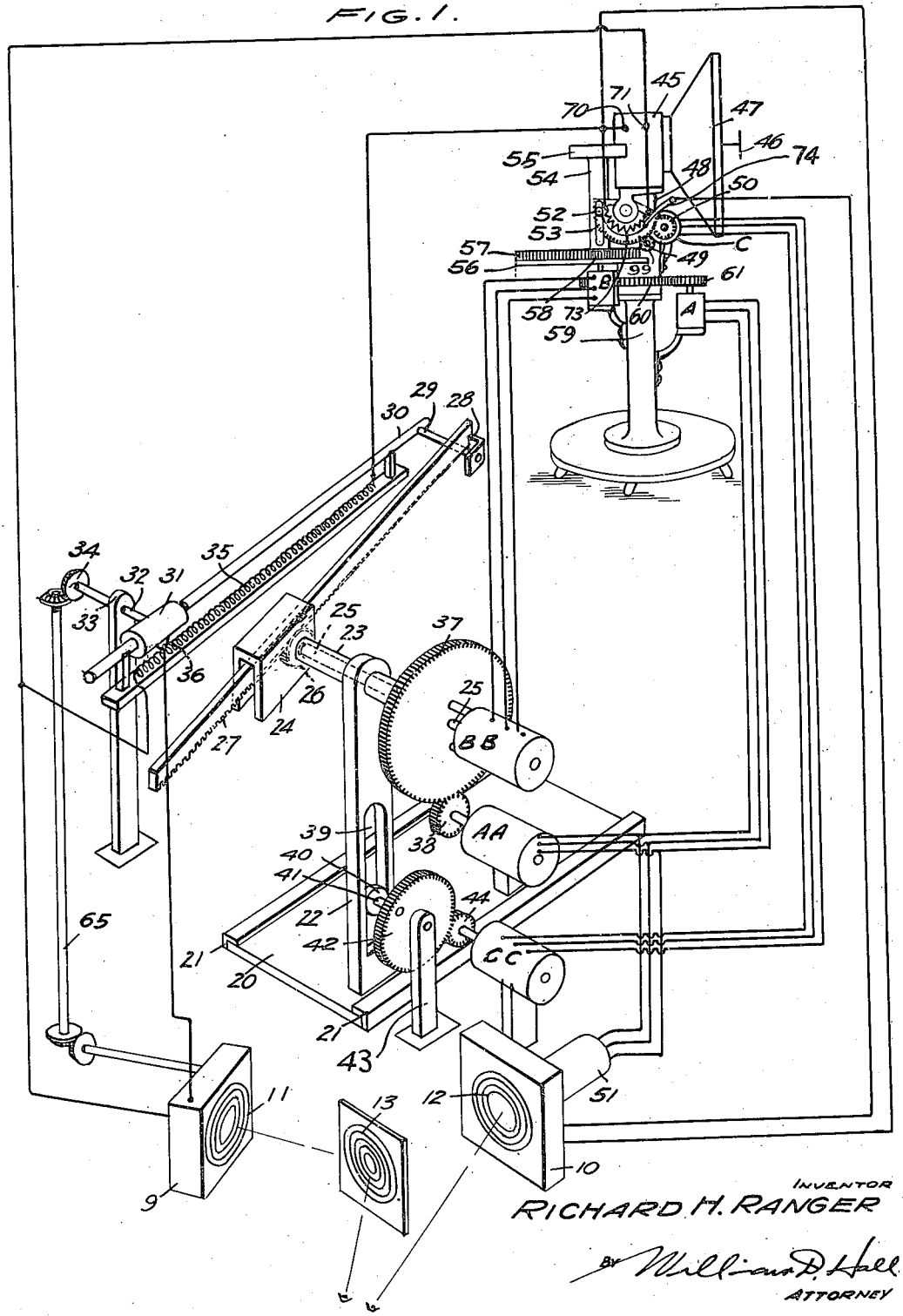
Figure 1 is a schematic diagram of a radio locating system embodying the invention.

The drawings indicate the echoes by black marks, whereas the normal plan position indicator gives them actually as bright white spots. As a matter of fact this invention works better by reversing the beam modulation control to get dark spots along bright traces to indicate echoes. This bright trace illuminates the transparencies excellently, and the echoes show up as black dots against the transparencies.

The radio locator system comprises a high frequency pulse transmitter and receiver 45 producing pulses which emanate from an antenna 46 and are propagated by a reflector 47. The transmitter and receiver 45 is pivotally mounted on a post 48 for rotary movements in a vertical plane. The post 48 is mounted on a pedestal 59 for rotary movements in a horizontal plane. Attached to the device 45 is a segmental gear 49 in mesh with a pinion which is manually manipulated to cause rotary movements in a vertical plane.

Forming a part of the system are two plan position indicators 9 and 10, which include oscilloscopes having respectively over the faces thereof sheets 11 and 12 of transparent material with transparent maps thereon of the locality being scanned. Positioned between the two devices 9 and 10 is a mirror 13 arranged at an angle adjustable to receive images from the device 9.

The plan position indicators 9 and 10 are of a type such as described in application of Huber et al. for U. S. Letters Patent S. N. 518,934, filed January 20, 1944, and each comprises a cathode ray tube in which a cathode ray sweeps back and forth from the center to the edge of the scanning disc, and at the same time is rotated uniformly over a complete circle. The radial motion back and forth of the trace from the center to the edge of the disc is so rapid that the effect is that of a continuous line extending from the center to the edge of the scanning disc, and this line is rotated around the disc with the center of the disc as an axis. When a pulse reflected from an object located is received by the radar device, this pulse appears upon the luminescent scanning disc of the plan position indicator. The distance of the pulse from the center of the disc indicates the range of the object, and angular position of the pulse from the base north-south line indicates the azimuth of the object.

Figure 2:
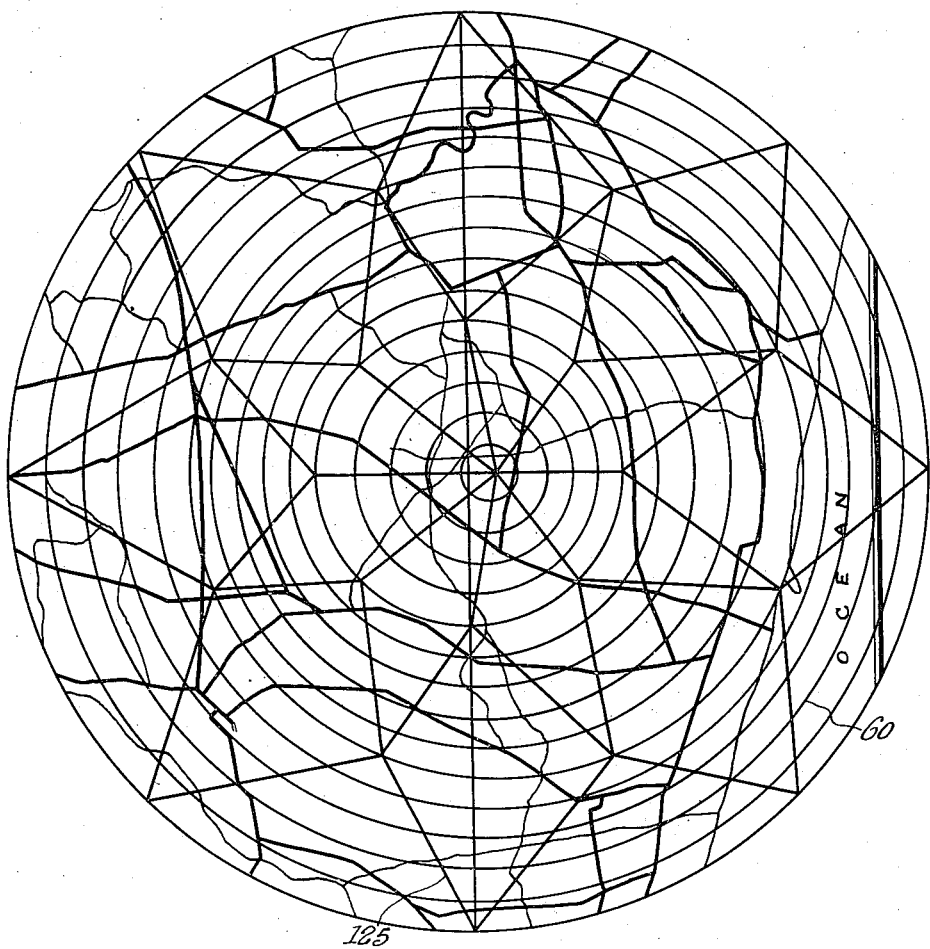
Figure 2 is a view showing the manner in which a map is marked for use in the system for the left eye. (In use, this view is printed on a transparency and the reverse of the map is presented to the mirror to bring the image into correct orientation, as the mirror again reverses the image to make it right.)
Figure 3:
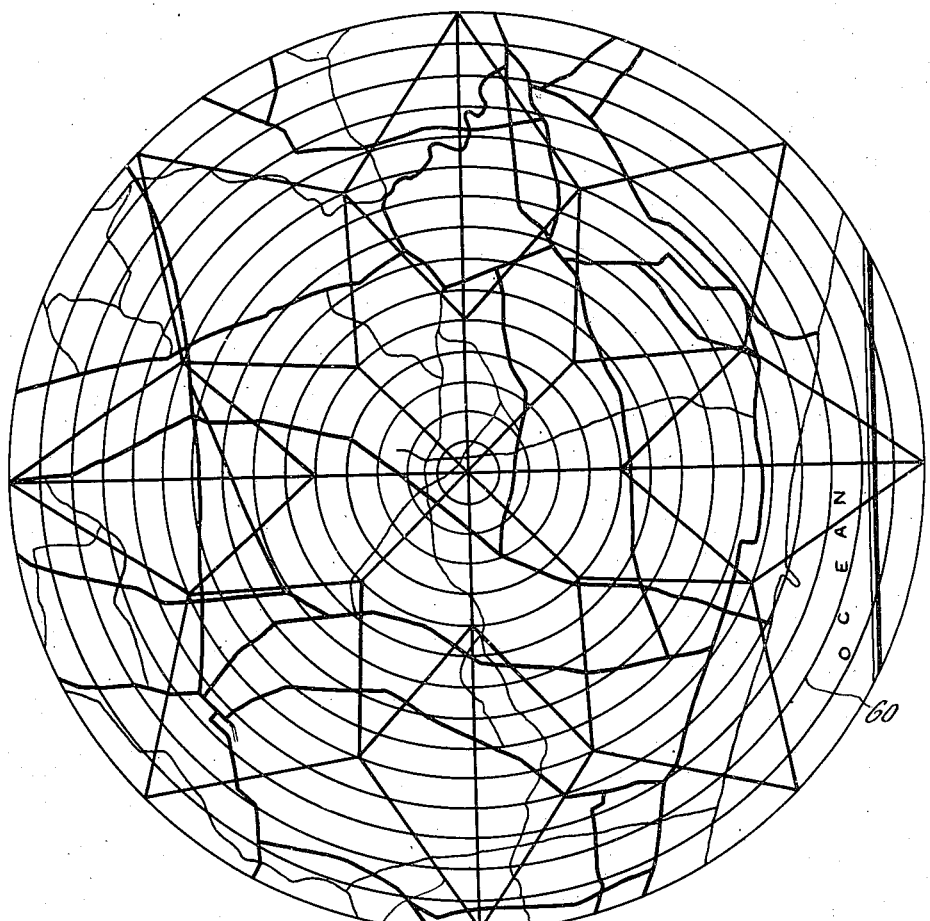
Figure 3 is a view showing the manner of marking the map for the right eye.
Figure 4:
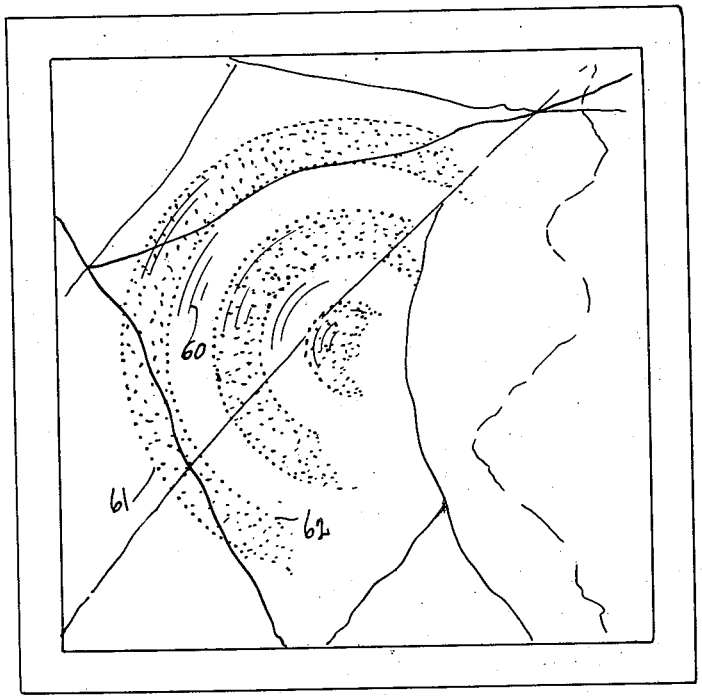
Figure 4 is a view showing the stereoscopic effect produced by the images of the marked maps.

Positioned over the transparent sheets 11 and 12 are transparent maps of the locality being scanned. These maps are shown in Figures 2 and 3. Each map has a plurality of circular contour lines 60 marked thereon. It will be noted that the circular contour lines for the map of Figure 2 are not concentric as are the circular contour lines for the map of Figure 3. As a modification, the circular contour lines of both maps may be eccentric in opposite direction by approximately one half the amount here shown in Figure 2 so as to secure the desired stereoscopic effect. This eccentricity is such that when the image of the map at 11 in the mirror 13 is viewed simultaneously with a direct view of the map at 12 a stereoscopic effect is produced, and there appears to be a plurality of concentric ridges 61 and valleys 62 (see Figure 4).

The spaced apart circles give the effect of a cone rising at the center of the map. The height of this cone at the apex is 25,000 feet, and it falls in 5,000 foot levels to the ground level at a distance of approximately two miles radius from the center. The contour spacing is then continued radially outward, rising around the central cone. This ridge then falls away again in 5,000 foot levels to the ground, and then rises again to a second ridge, and so on.

In order to enable the eye to pick up the elevations readily, diagonal lines 125 are run between the circular contour lines representing the bottom and the top elevations. Eight points on each such circle are chosen, and the lines run up and down. This helps materially in focusing the eyes.

To determine the proper eccentricity in drawing the circles to give the stereoscopic effect, an imaginary situation has been developed. That is, in looking at any given point, the images representing that point for the left and the right eyes are assumed to be those that would be observed at distances of infinity from the map but still at an angular separation for the eyes as they would be as if they were only 15 inches from the map. This is an important point. At fifteen inches from the map, and with 2½ inch separation of the eyes, the angular divergence from a point on the center of the map to each of the eyes is approximately ten degrees. But this divergence is assumed to be constant and equal for any point on or above the map. This would be the hypothetical situation of having the eyes at infinity but still with this same angular divergence of ten degrees.

At first, this divergence was distributed equally for the right and left images, but when it was found equally effective to have the angle for one eye to be perpendicular to the map, and all the ten degree divergence used on the other. An arbitrary convention has been made of assuming the image for the right eye is the perpendicular projection of all points above the map, onto the map, and the image for the left eye is made up by projecting all points above the map at an angle of ten degrees off the vertical onto the map.

No account is taken of the fact that in normal stereoscopic effects the eye is at a nearby single point and looks forward and to the left and right. This new scheme simplifies the drawing considerably and gives much clearer delineation of the height of each portion above the map. It likewise prevents the great distortions towards the outside of the map which would otherwise occur; and simplifies the adaption of the idea to actual radar presentations.

Normal stereoscopy is really a combination of perspective in each view and then a varying angular divergence for each portion of the view. This new stereoscopy in which the angular divergence is constant for all elevations has been called stereo-parallax because it gives stereoscopic effects by parallel projections. It has the decided advantage of giving equal displacement for all points at equal heights above the map. It makes for easier observance and much more definite estimates of height.

For the left eye image, the center of each of the contour circles is offset to the left (when viewed in the device) by an amount proportional to the height that a given circle contour is supposed to represent. These centers appear on the right in Figure 2 because this is a front view, as seen through mirror 13 as Figure 1 shows, of the rear of the map constituting transparent sheet 11 placed on plan position indicator 9. As the tangent of 10° is approximately one-sixth, it is seen that the eccentricity is one-sixth the elevation to be represented. So, for equal heights, the circular contour lines representing the same height on any of the imaginary ridges in space will have centers displaced to the right of the ground center of the map by an amount representing one-sixth of the height to be indicated.

The net effect of the circles and diagonals is to build up a very delicate illusionary structure of fine lines above the map, looking like a jelly mold.

The presence of the map is a very distinct contribution to the apparent reality of the stereo-presentation. The roads, towns and printing give a well-defined base from which the contur lines appear to rise. This illusion is also helped by having other references at the various heights. Numbers and words indicating the heights are properly spaced to appear to be at the same apparent heights as they indicate.

It is to be noted that for points above the ground the left projections are moved to the left at screen 11. They appear on the right in Figure 2 because this is a front view as reversed by mirror 13. This is to make points nearer the left eye diverge to the right. So the movement to the left on the print actually makes the left eye move to the right to accommodate in focusing the two eyes on the spot.

Figure 6:
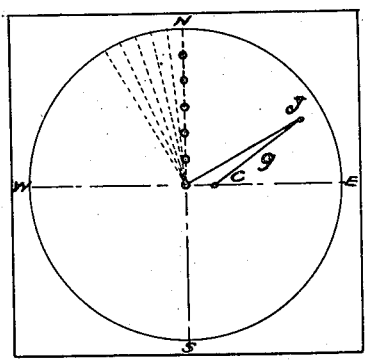
Figure 6 is a view of the screen of an oscilloscope used in a plan position indicator.
Figure 5:
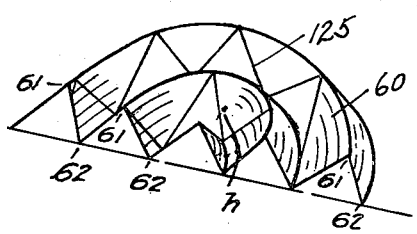
Figure 5 is a view showing a cross section cutaway of the apparent stereoscopic image.

It is assumed that the radar is located at the center of this whole presentation and on the ground level. The normal trace will then radiate out from this center. (See Figure 6). If the radar is pointed horizontally straight out, the trace should appear as being at zero elevation throughout its length. This would obviously be the normal presentation, as is now accomplished in plan position indicator work. As the radar sweeps around, a Selsyn connection accomplishes the rotation of the position indicator controls to cause the sweep to change angle to correspond to the changing angle of the radar.

Now, assume that the radar is changed from the horizontal position or zero elevation, to some higher position, say 10°. This is accomplished by manually rotating a pinion 99 as to cause rotation of the segmental gear 49. (See Figure 1.) Starting with the sweep running straight out to the right in an easterly direction from the center of the map, as far as the angles are concerned both the left and right presentations (Figure 6) will be at the same azimuth angle for this particular condition. They will again be at the same azimuth angle when the sweep gets around 180° in a westerly direction. At all other points the two presentations will not coincide.

Considering the right presentation alone, inasmuch as the radar is now directed upward at an angle at 10° it is obvious that as the trace now comes up as well as out, the eye will see a foreshortened projection of this trace on the map and this means that a potentiometer control of the extent of the sweep must be realized when the radar is raised in elevation to this 10° angle. With this presentation the trace will be foreshortened in direct proportion to the cosine of the angle of elevation.

This is modified, however, for the left eye over the right. The left eye will see all points which are above the ground level displaced to the right by an amount proportional to their height from the ground. Fortunately, this displacement is absolutely uniform, so that if it is a horizontal circle that we are looking at, it still remains as a complete circle displaced in its entirety to the right by the proportionate amount corresponding to its elevation above the map. Such a circle would be one such contour of space elevation above the ground.

Now, as the radar device is pointed at an angle south of east and still assuming that the elevation is up 10 degrees, it is obvious that the successive points out along the trace will be increasingly deflected to the right for the left eye observation. This change is exactly proportional to the distance out from the center, so that one adjustment for a given position in elevation and azimuth is all that is necessary for any point on that trace and this is a linear adjustment on the gain response of the scope.

Inasmuch as these points are progressively to the right, it is obvious that for any azimuth position to the right of the north-south vertical line (see Figure 6) the azimuth angle for the left eye presentation will be decreased back towards the horizontal east-west line. As a matter of fact, the angle in any given instance will be at the original angle of declination from east, taken, however, from the displacement center on the east-west axis, corresponding to the height of the furthest point out J on the trace V.

In the system shown in Figure 1 the operator views in the mirror the image of the left indicator 11 with the left eye, and looks directly at the right indicator 12 with the right eye.

For the right stereogram, the projection will be a plan view of everything above the ground represented as a vertical projection right down to the map. This is as if the eye were at infinity looking vertically down on the area. For the left image, the one that is used through the mirror, proper parallax to the right must be introduced to give the stereoscopic effect. As the mirror reverses the action this requires a shift to the left proportional to the height above the map.

Figure 7:
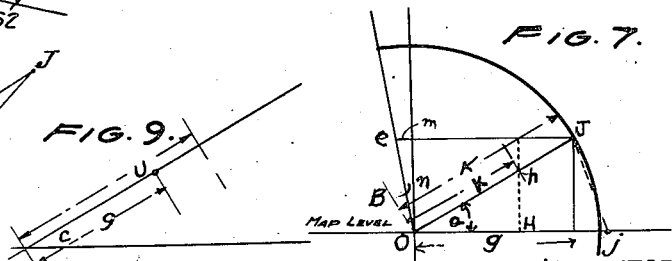
Figures 7, 8 and 9 are diagrams explanatory of the method employed.

Figure 7 is a vertical view showing the appropriate triangulation for points above the line of the map shown as the horizontal line along the bottom. Assume a trace 6 inches long on the plan position indicator for objects on the ground. Then any targets on the ground will show up on the 6-inch trace at the appropriate azimuth in the plane of the map. In other words, this is for zero elevation. Now, suppose the radar is elevated at an angle $a$ shown in Figure 7 to pick up an airplane above the area covered by the map. The same relative position would be indicated as shown by the plane on the line K at $h$. It is obvious that now the trace on the plan position indicator should be reduced to the length $g$ which is the length out along K times the cosine of angle $a$.

Every point on the trace which normally represents the full distance K or 6 inches must likewise now be reduced by a potentiometer control which reduces the sweep to this cosine amount, i. e. $g=k \cos a$. So every point will be represented on the ground level as a vertical projection down from the point indicated above the map. The dotted line coming down from $h$ to $H$ indicates this.

Figures 8, 9:
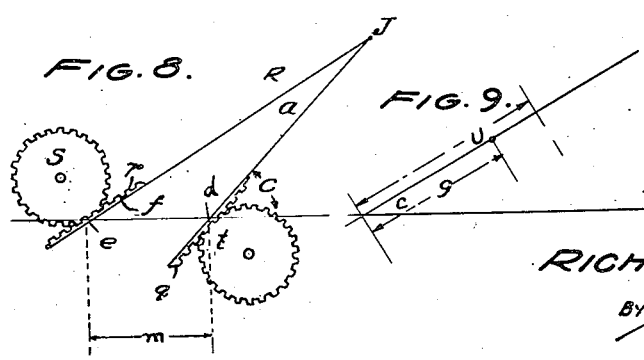

For the right stereogram all points will therefore be represented as shown first on Figure 7, then on Figure 9. Figure 3 is a plan view for the right eye and Figure 2 is a plan view for the left. For any given azimuth on the right stereogram, say angle $c$, the trace should be represented along the line U but its length will be foreshortened by the same amount as indicated in Figure 7, the cosine of the angle times K, or $u=K \cos a$. This potentiometer can be mounted directly on the elevation control of the radar device.

For the left stereogram, it is necessary to use a compensating arrangement to change the sweep in accordance with the elevation and azimuth angle as well. A mechanical linkage will accomplish this. This is shown diagramatically in Figure 8 and structurally in Figure 1. At $t$ a gear is driven by a Selsyn, operated from the vertical elevation control of the radar. This gear pulls the rod Q back and forth so that the point $d$ is at a distance corresponding to the foreshortening of the sweep appropriate for the angle of elevation. If we assume 6 inches as the sweep, we could assume also that for this mechanical control we have 6 inches as the full extended length of Q when the radar is looking horizontally out at an angle of elevation "zero." As the radar is raised, Q will be foreshortened by action of the Selsyn on the spur gear $t$ turning clockwise to draw in Q. This whole combination of $t$ and the rack $q$ will be rotated about the point $d$. There is the normal Selsyn control also for the azimuth which rotates Q and the entire mechanism with it to an angle $c$ exactly the same as for the right stereogram, corresponding to the azimuth at which the radar happens to be.

As seen from Figure 7, on looking down on the left stereogram, it is essential that the trace appear to start at the center O and rise the full length of K to J. Now point J is on a circle whose center must be at point $e$ for the left eye. This movement of the elevation circle to the left is shown in Figure 8 where the points of contact of the lines R and Q and their spur gears on the left stereogram are separated by this same amount $m$. Therefore, for any elevation of K above the ground level, such as at angle $a$, the point of contact $d$ between gear $t$ and rack $q$ must be moved to the right an amount equal to $m$. Inasmuch as we are working on a six to one displacement for the left stereogram this means that $m$ over $n$ (see Figure 7) is one-sixth, which therefore, makes the tangent of B equal to one-sixth; so finally, $n$ is one-sixth of the sine of angle $a$ as $n$ equals one-sixth of the sine of angle $a$. Therefore, mechanical arrangements must be made by cams or otherwise to move the rotation point of arm Q to the right as the radar is pointed at higher elevations. The two arms R and Q are pivoted together at J. For zero elevation, $m$ is zero and the gear $t$ is moved back to the left, and the two centers $e$ and $d$ are in line with each other.

Now, assume an angle of azimuth $c$ for both the right stereogram and this left mechanical linkage as shown at $c$. We will get a correct center position of the left plan position indicator trace, shown as R, determined by the point $e$ which presents a fixed point controlling the angular sweep of R. It is seen that when the arm R rotates it engages a pinion $s$. This pinion drives a potentiometer control which determines the gain for the sweep of the left plan position indicator in such a manner that the actual mechanical length of R from point $h$ to $e$ is duplicated by the sweep of the trace on the left plan position indicator.

Finally, if the angle of rotation $f$ is transmitted directly to the control of the left plan position indicator 9 as by gearing 34 and shaft 65, Fig. 1, we have a means of determining the exact angle at which the left position indicator trace should be to give a correct left stereogram for all points picked up on the radar and presented in parallax by the left stereogram. (It must be remembered that all of the above discussion is for apparent points, i. e. as seen in the mirror. The actual trace will be reversed left to right as well as all the movements in the plan position indicator 9.)

Any points such as $h$ on the actual radar as indicated on K will be foreshortened by the appropriate amount on the sweep determined by arm R of Figure 8.

A mechanical apparatus for controlling the sweep of the left plan position indicator is shown in Figure 1. The apparatus is shown greatly enlarged relative to the plan position indicator. In this apparatus, a bed plate 20 is slidably positioned between guide flanges 21, and has, projecting up therefrom, a post 22 which rotatably supports a sleeve 23 fixed to a casing 24. Rotatably positioned in the sleeve 23 is a shaft 25 fixed to a casing 24. Rotatably positioned in the sleeve 23 is a shaft 25 fixed to a pinion 26 in mesh with a rack 27. The pinion and rack are positioned in casing 24. Pivot 29 is lower than the pitch line of the rack 27 by an amount equal to the radius of the pitch circle of the gear 26 so that the distance of the pivot point 28 will be uniform and equal to the displacement of the rack caused by rotation of gear 26 in casing 24. The rack 27 has one end bent back on itself at 28, and is rotatable on a pin 29, which is also rotatably connected to a rod 30 passing through a short tube 31 which has fixed thereto a shaft 32 rotatably supported by a post 33 and connected to a member 34 which controls the rotation of rotating magnets of the left plan position indicator for causing the sweep to rotate about the face of the cathode ray tube as above explained and illustrated in Figure 6. In Figure 1 this connection is indicated by the arm 65 with appropriate bevel gears starting with 34. It is to be noted that counter-clockwise rotation of 24 accomplishes clockwise rotation of 66 which is corrected to give the reversed image. It is likewise obvious that these bevel gears could be eliminated and member 34 could work directly on the P. P. I. magnetic rotation. It is shown this way for clarity.

Supported by the rod 30 is a variable resistance 35 engaging a contact 36 supported by the tube 31.

Fixed to sleeve 23 is a gear 37, in mesh with a pinion 38 fixed to the shaft of a Selsyn motor AA. The post 22 has a slot 39 in which moves a small wheel 40 rotatably mounted on a stub shaft 41 eccentrically fixed to a gear 42 which is rotatably supported by a stationary post 43. The gear 42 is in mesh with a pinion 44 connected to the shaft of a Selsyn motor CC. The shaft 25 passes freely through gear 37 and is connected to the shaft of a Selsyn motor BB, which is mounted on gear 37, the gear and motor rotating together.

This apparatus is associated with a radar device which comprises a radio receiving and transmitting apparatus 45 for emitting very short radio waves from an antenna 46 and projecting them by a reflector 47.

The device is pivotally mounted on a post 48 and carries a toothed segment 49 in mesh with a pinion 50 connected to the shaft of a Selsyn motor C. The segment 49 carries a roller 52 which moves in a slot 53 of a vertical bar 54, of a Scotch yoke, the upper end of which is slidable in a channel 55, and the lower end is slidable on an angle bar 56 and carries a rack 57 in mesh with a pinion 58 connected to the shaft of a Selsyn motor B. The post 48 is rotatably mounted on pedestal 59 and carries a gear 60 in mesh with a pinion 61 connected to the shaft of a Selsyn motor A.

Selsyn motors A, B, C, are connected respectively to Selsyn motors AA, BB, and CC, and Selsyn A is also connected to the azimuth Selsyn 51 of the right position indicator 10, to control the rotation of the rotating magnets mentioned above. Selsyn A drives Selsyn AA with gearing to make a one to one rotation of gear 37 with azimuth rotation of the radar. B Selsyn operates Selsyn BB to give a one to one movement of rack 27 with linear movement of scotch yoke 54 assuming each moves a maximum of six inches. Selsyn C operates Selsyn CC with appropriate gearing to make it a six to one reduction, so movement of post 22 is proportional to one sixth the sine of the angle of elevation.

Terminal 70 of the radar device is connected to one end of resistance 35, to one end of a variable resistance 73 on segment 49, and to right plan position indicator 10. Terminal 71 is connected to the other end of resistance 35, to the left plan position indicator 9, and to the other end of resistance 73. Contact 36 on tube 31 engaging resistance 35 is connected to left indicator 9; and a sliding contact 74 engaging resistance 73 is connected to right indicator 10.

In operation, the horizontal movements of the radar device are transmitted through Selsyn A to Selsyn 51 to control the right indicator 10. These movements are also transmitted from Selsyn A to Selsyn AA to rotate spur gear 38 and thus gear 37, sleeve 23, casing 24, and through bar 27, rod 30, and member 34, to affect the rotating magnets of the left indicator 9.

Vertical movements of the radar device will cause rotary movement of segment 49 to vary the position of the contact 74 on potentiometer 73 and thus affect the applied voltage of the sweep circuit of right indicator 10.

At the same time, movement of segment 49 will rotate pinion 50 to cause Selsyn C to rotate Selsyn CC, which rotates gear 42, by spur gear 44, to cause eccentrically mounted roller 40 to move in slot 39 and move post 22. Since the post 22 is fixed to plate 20, the latter will slide in the guides 21, carrying therewith the structure mounted thereon to cause rod 30 to move in tube 31, and moving contact 36 on the potentiometer 35 to vary the voltage applied to the sweep circuit of the left indicator 9 as above described. The object is to get a direct interpretation of the amount of motion of the bar 54 to the right on Selsyn B. The rack 27 is moved an amount proportionate the movement of bar 54. The bar 54 must move 6 inches for 90 degree vertical rotation to give a 6-inch movement to rack 27 to establish the correct procedure for the length of rack 27 to be proportional to the cosine of the angle of elevation of the radar device. In other words, the distance of pivot 29 is 6 inches out from the center of rotation of sleeve 23 when the radar device is horizontal and it is zero inches out when the radar device is vertical. At all positions its movement is proportional to the cosine of the angle of elevation of the radar.

The azimuth Selsyn A drives Selsyn AA and drives the gear 37 which in turn rotates arm 28 and carries around the rod 30 in an eccentric manner depending upon the lateral separation of support 22 from post 33. This lateral separation is determined by the elevation of the radar, affecting Selsyn CC to rotate gear 42.

For the right plan position indicator, Selsyn C works on a Selsyn 51. The variable resistance 73 on segment 49 controls the gain of the sweep circuit for the right plan position indicator so that the sweep length is proportional to the cosine of the angle of elevation. In order to accomplish this, the resistance 73 must be "tapered" to match the cosine of the angle of elevation. That is, the resistance must be graduated by unit length and not have uniform resistance per unit length.

I claim:

1. In a stereoscopic device, a right plate and a left plate spaced apart, identical map designs positioned on said plates, a plurality of equally spaced concentric circles on said right plate, a plurality of corresponding eccentrically spaced circles on said left plate, corresponding circles having the same radius and having centers progressively displaced from the center of said map as the radius is reduced, a symmetrical system of lines on said right plate connecting the outer circle with the center, elements of said line system terminating symmetrically and consecutively on equally spaced circles intermediate between the outer circle and the center, a system of lines on said left plate similar to those on the right plate and connecting corresponding displaced circles whereby the circle and line systems when viewed in stereoscopic fusion appear as a series of conical ridges and valleys on whose side walls appear a series of contour lines intermediate between the ground plane and the apices of ridges.

2. In a device for indicating the position of an object in space above the ground plane, stereoscopic means comprising, a right and a left plate each provided with identical transparent map designs and supported for stereoscopic viewing, each map having inscribed thereon different but corresponding grid-like designs, said right grid design comprising a series of concentric equally spaced circles, and a symmetrical system of lines connecting the outer circle with the center, elements of said line system terminating symmetrically and consecutively on equally spaced circles intermediate between the outer circle and the center, said left grid design comprising a series of circles similar to those on the right plate, corresponding circles having the same radius and having their centers respectively displaced from the center of the outer circle as the radii are reduced, and a system of lines similar to those on the right plate connecting the outer circle with the center of the innermost circle, elements of said line system terminating on corresponding intermediate circles whereby the circle and line systems when viewed in stereoscopic fusion appear as a series of ridges and valleys on whose side walls appear a series of contour lines intermediate between the ground plane and the apices of said ridges.

RICHARD H. RANGER.

(References on following page)

REFERENCES CITED

The following references are of record in the file of this patent:

UNITED STATES PATENTS

| Number | Name | Date |
|---|---|---|
| 934,916 | Von Hofe | Sept. 21, 1909 |
| 1,743,952 | Barr et al. | Jan. 14, 1930 |
| 1,816,181 | Eliel | July 28, 1931 |
| 1,858,353 | Aldis | May 17, 1932 |
| 1,864,899 | French | June 28, 1932 |
| 1,921,630 | Mechan | Aug. 8, 1933 |
| 1,987,765 | Wandersleb | Jan. 15, 1935 |
| 2,189,549 | Hershberger | Feb. 6, 1940 |
| 2,227,598 | Lyman et al. | Jan. 7, 1941 |
| 2,307,981 | Babcock et al. | Jan. 12, 1943 |
| 2,352,176 | Bogopolsky | June 27, 1944 |
| 2,359,703 | Wood | Oct. 3, 1944 |
| 2,388,858 | MacNeille et al. | Nov. 13, 1945 |

FOREIGN PATENTS

| Number | Country | Date |
|---|---|---|
| 4,506 | Great Britain | 1910 |

OTHER REFERENCES

Judge, Arthur W.: Stereoscopic Photography, published in 1926 by Chapman & Hall Ltd., London, pages 18, 19, 134, 35, 172, 229, 230.